United States Patent [19]

Iseler et al.

[11] Patent Number: 5,009,120
[45] Date of Patent: Apr. 23, 1991

[54] MANUAL CONTROL FOR ADJUSTABLE STEERING COLUMN

[75] Inventors: Stanley J. Iseler, Midland; Howard D. Beauch, Frankenmuth; Benjamin H. Everett, II, Saginaw; John P. Sutorik, Frankenmuth, all of Mich.

[73] Assignee: General Motors Corporation, Detroit, Mich.

[21] Appl. No.: 483,617

[22] Filed: Feb. 23, 1990

[51] Int. Cl.$^5$ ............................................. B62D 1/18
[52] U.S. Cl. ..................................... 74/493; 74/527; 280/775; 403/104
[58] Field of Search ............... 74/493, 527; 280/775; 403/104, 106

[56] References Cited

U.S. PATENT DOCUMENTS

| | | | |
|---|---|---|---|
| 2,744,419 | 5/1956 | Chayne | 74/493 |
| 3,245,282 | 4/1966 | Kimberlin | 74/493 |
| 3,444,753 | 5/1969 | Runkle | 74/493 |
| 4,317,387 | 3/1982 | Myers et al. | 74/527 |
| 4,463,625 | 8/1984 | Nishihawa | 280/775 |
| 4,539,861 | 9/1985 | Nishikawa | 74/493 |
| 4,541,299 | 9/1985 | Kanaya et al. | 74/493 |
| 4,563,912 | 1/1986 | Parks | 74/493 |
| 4,709,592 | 12/1987 | Anderson | 74/493 |
| 4,774,851 | 10/1988 | Iwanami et al. | 74/493 |
| 4,941,679 | 7/1990 | Baumann et al. | 280/775 |

Primary Examiner—Leslie A. Braun
Assistant Examiner—Scott Anchell
Attorney, Agent, or Firm—Saul Schwartz

[57] ABSTRACT

An infinitely adjustable manual control for a lengthwise adjustable automotive steering column of the type having a stationary outer member and an inner tubular member slidable telescopically in the outer member. The manual control includes a housing on the outer member, a clutch element mounted on the housing for radial and lateral shiftable movement, and rack teeth on the clutch element and on the inner tubular member. In a lowered position of the clutch element, the rack teeth mesh to immobilize the inner tubular member relative to the outer member. In a raised position of the clutch element, the rack teeth are disengaged. The rack teeth are oriented at an angle to the longitudinal centerline of the steering column so that the lateral movement of the clutch element in the housing effects longitudinal movement between the rack teeth to assure mesh in all relative positions of the inner and outer members. An actuator and a pair of side bars on the housing releasably secure the clutch element in its lowered position. A flexible cable controlled by the driver operates the actuator to release the clutch element for movement to the raised position when lengthwise adjustment is desired.

5 Claims, 4 Drawing Sheets

MANUAL CONTROL FOR ADJUSTABLE STEERING COLUMN

FIELD OF THE INVENTION

This invention relates to a manual control for a lengthwise adjustable automotive steering column.

BACKGROUND OF THE INVENTION

Typical telescopic or lengthwise adjustable automotive steering columns include a first member mounted on a second member for sliding movement in the direction of the longitudinal centerline of the steering column. The second member is usually rigidly connected to the vehicle body and a steering wheel is usually rotatably supported at the outboard end of the first member such that the steering wheel moves in-and-out with the first member relative to the second member. A common infinitely adjustable manual control for capturing the position of the first member relative to the second member includes a band or similar clamp anchored to the second member and looped around the first member. A lever manipulated by the driver loosens the band to permit infinite positional adjustment of the first member and tightens the band to fix or capture the adjusted position. Another common infinitely adjustable manual control for capturing the adjusted position of the first member includes friction shoes on one of the first and second members which are urged radially against the other by a longitudinally movable wedge controlled by the driver. The mechanical advantage of the wedge amplifies the longitudinal force on the shoe to generate high friction between the latter and the one of the members against which it bears to capture of the adjusted position of the first member relative to the second member. An infinitely adjustable manual control according to this invention positively captures of the adjusted position of the first member through meshing engagement of rack teeth on the first member and a clutch element on the second member.

SUMMARY OF THE INVENTION

This invention is a new and improved infinitely adjustable manual control for a lengthwise adjustable automotive steering column of the type including a stationary outer housing and an inner tubular member mounted on the outer housing for in-and-out telescopic movement. The manual control according to this invention includes a toothed clutch element mounted on the housing for radial movement and for lateral movement relative to the longitudinal centerline of the steering column, and rack teeth on the inner tubular member. In a lowered position of the clutch element in the housing, the clutch element rack teeth mesh with the rack teeth on the inner tubular member to capture the position of the tubular member. In a raised position of the clutch element in the housing, the rack teeth are disengaged so that the inner tubular member is infinitely adjustable. The clutch element rack teeth and the rack teeth on the inner tubular member are formed at acute angles relative to the longitudinal centerline of the steering column so that lateral movement of the clutch element in the housing effects longitudinal relative movement between the rack teeth to assure infinite adjustability of the inner tubular member relative to the outer housing. A manually retractable actuator on the housing maintains the clutch element in its lowered position and a pair of retractable side bars maintain the lateral position of the clutch element.

DESCRIPTION OF A PREFERRED EMBODIMENT

Figure 1:
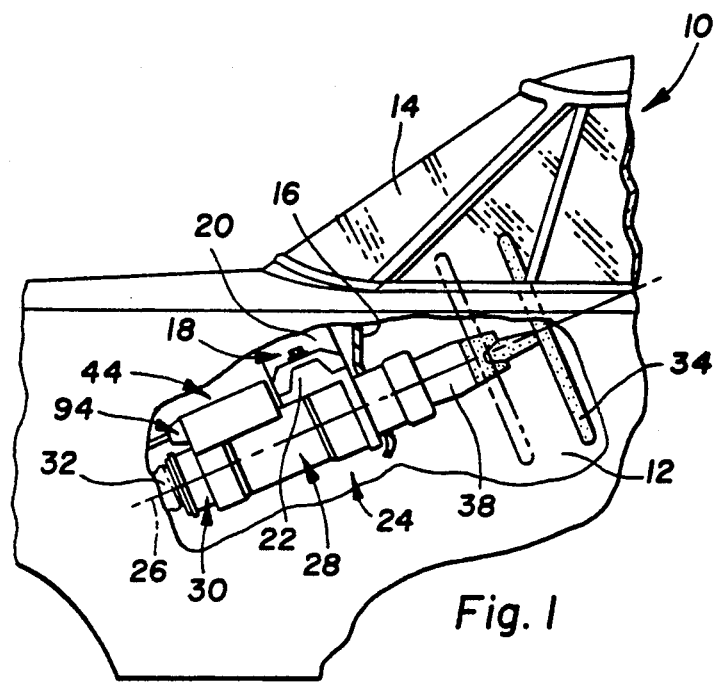
FIG. 1 is a partially broken-away side elevational view of an automobile having a lengthwise adjustable steering column and a manual control according to this invention.
Figure 2:
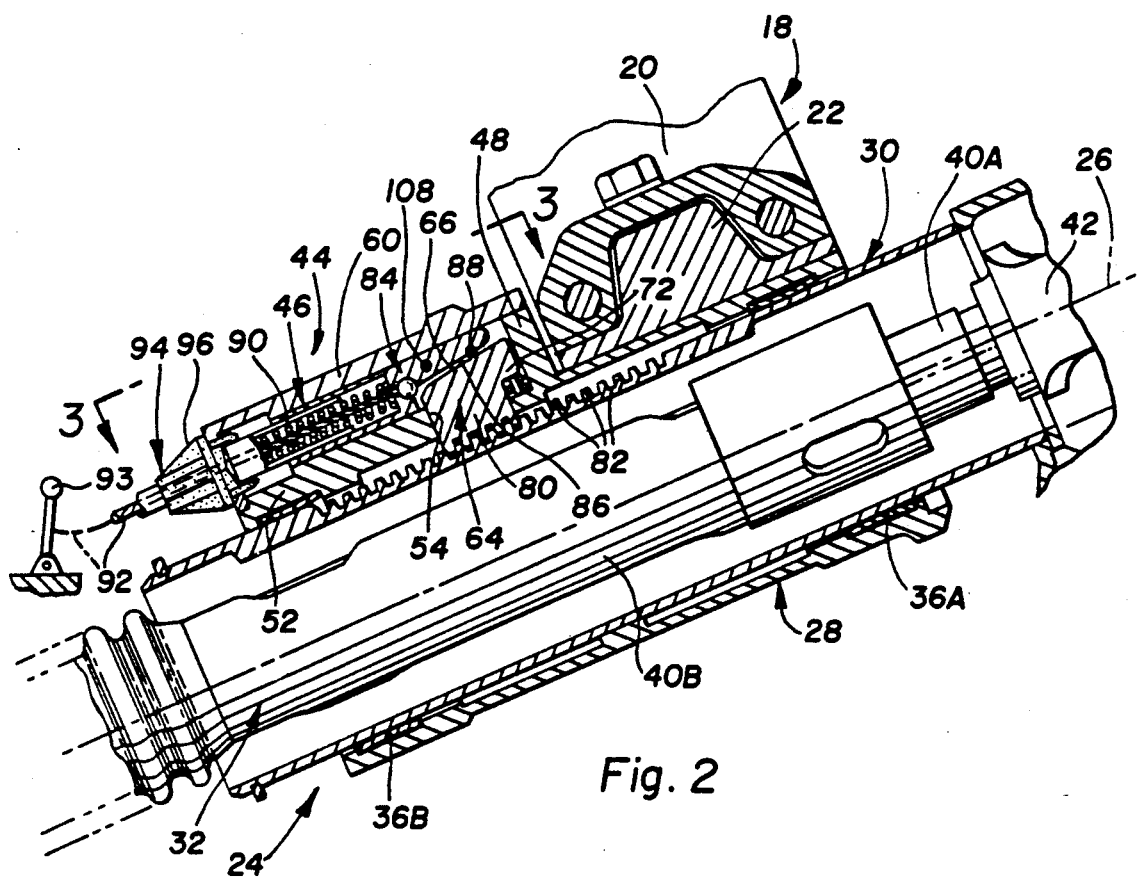
FIG. 2 is an enlarged longitudinal sectional view of a portion of the steering column shown in FIG. 1 and of the manual control according to this invention.
Figure 3:
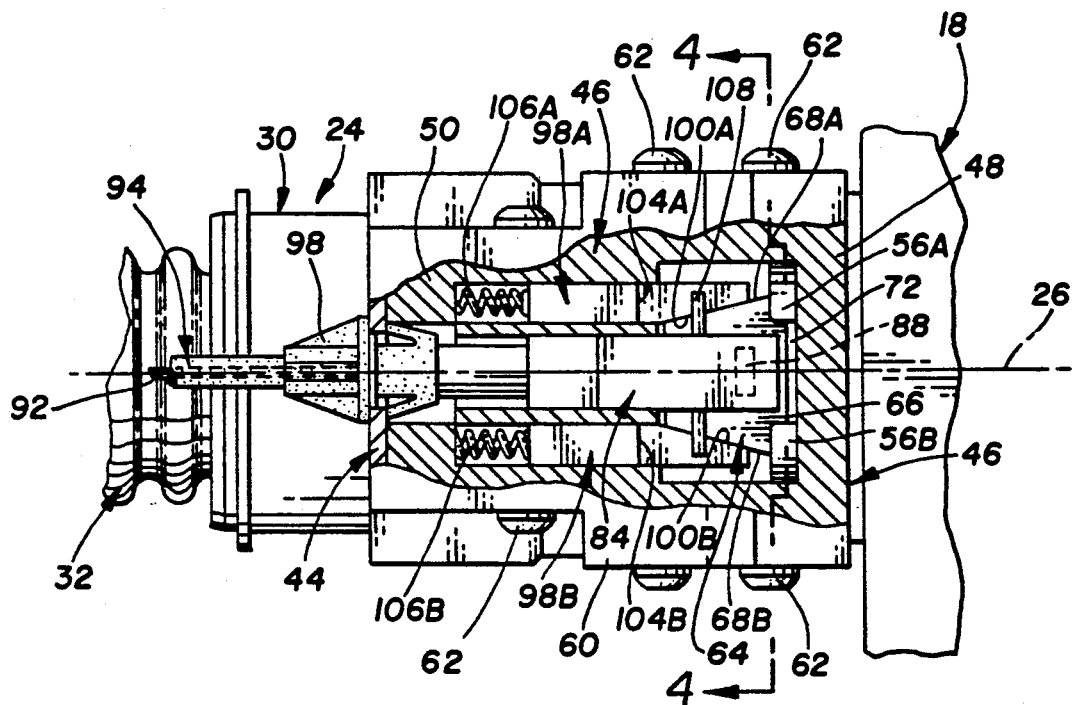
FIG. 3 is a partially broken-away plan view taken generally along the plane indicated by lines 3—3 in FIG. 2.
Figure 4:
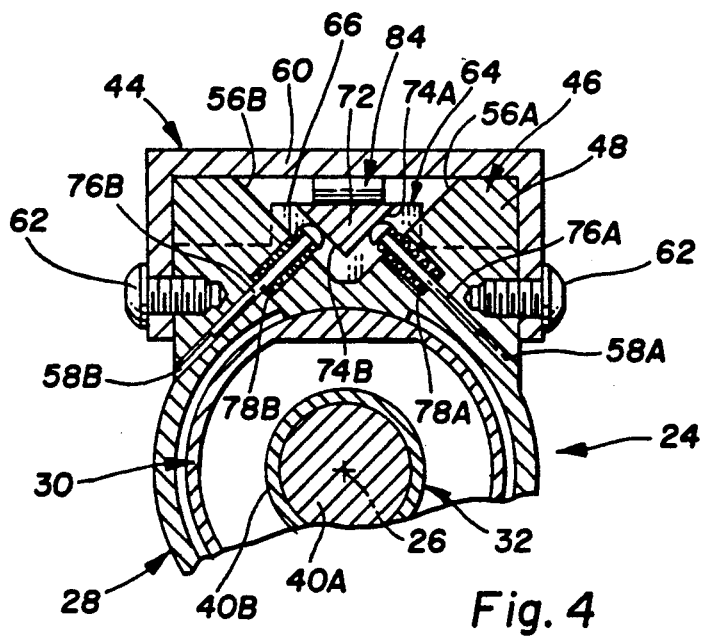
FIG. 4 is a sectional view taken generally along the plane indicated by lines 4—4 in FIG. 3.

Referring to FIGS. 1 and 2 of the drawings, an automobile body 10 has a passenger compartment 12 defined therein behind a front windshield 14 and an instrument panel 16. A steering column mounting bracket 18 forward of the instrument panel includes a fixed upper part 20 and a lower part 22 adapted for lateral adjustment relative to the upper part and for rigid connection to the latter. A steering column 24 having a longitudinal centerline 26 is disposed in the passenger compartment and supported near its top or outboard end by the mounting bracket 18 and at its lower or inboard end, not shown, by a steering gear or other appropriate bearing.

The steering column 24 includes a first member or outer housing 28 aligned on longitudinal centerline 26, a second or inner tubular member 30, a steering shaft 32, and a steering wheel 34. The outer housing 28 is rigidly connected to the lower part 22 of the mounting bracket 18. The inner member 30 is supported on the outer housing by a plurality of bearings 36A-B, FIG. 2, for bodily shiftable movement in the direction of longitudinal centerline 26. A tilt-housing 38 is attached to the outboard end of the inner member for bodily shiftable movement as a unit therewith and for up and down tilting movement relative thereto about a horizontal axis, not shown, perpendicular to centerline 26.

The steering shaft 32 includes a two-piece lower element 40A-B and a unitary upper element, not shown, rotatably supported in the tilt-housing 38. The steering wheel 34 is rigidly connected to the outboard end of the upper element. The lower element 40B telescopically receives the lower element 40A and is rotatable as a unit therewith about the centerline 26. The lower element 40B is connected to a steering gear, not shown. The upper end of lower element 40A is connected to the upper element through a partially illustrated universal joint 42 which transfers torque between the upper and lower elements regardless of the angular position of the tilt-housing relative to the inner member 30. A manual control 44 according to this invention releasably captures the lengthwise or axial position of the inner member 30 relative to the outer housing 28.

As seen best in FIGS. 2-5, the manual control 44 includes a housing 46 integral with the outer housing and adjacent the mounting bracket 18. The housing 46 has a first wall 48 and a parallel second wall 50, FIG. 3, in planes perpendicular to the centerline 26 and an inner wall 52, FIG. 2, parallel to the centerline 26. The inner wall has a transverse slot 54 therein near the first wall located symmetrically with respect to the longitudinal vertical center-plane of the steering column 24. The first wall 48 has a V-shaped notch therein, FIG. 4, defined by a pair of converging edges 56A-B. A pair of stepped bores 58A-B in the first wall 48 extend perpendicular to the converging edges 56A-B, respectively. A cover 60 fastened to the housing 46 by a plurality of screws 62, FIG. 4, defines an outer wall of the housing 46 opposite the inner wall 52.

The manual control 44 further includes a clutch element 64 disposed in the slot 54 for bodily shiftable movement radially and laterally relative to the centerline 26. A first inclined ramp 66 is defined on top of the clutch element 64 and a second inclined ramp 68A and a third inclined ramp 68B are defined on opposite sides thereof, FIGS. 3,5 and 6. A pair of shoulders 70A-B on the clutch element 64 interrupt the second and third inclined ramps, respectively.

The clutch element 64 further includes a V-shaped lifting tang 72 overhanging the converging edges 56A-B. The lifting tang has a pair of converging sides 74A-B facing the converging edges 56A-B on the first wall 48 of the housing 46. A pair of plungers 76A-B in the stepped bores 58A-B are urged against the converging sides of the lifting tang by a pair of springs 78A-B in the bores. The plungers 76A-B bias the clutch element 64 toward a raised position, not shown, wherein the first inclined ramp 66 is near or against the cover 60.

Figure 5:
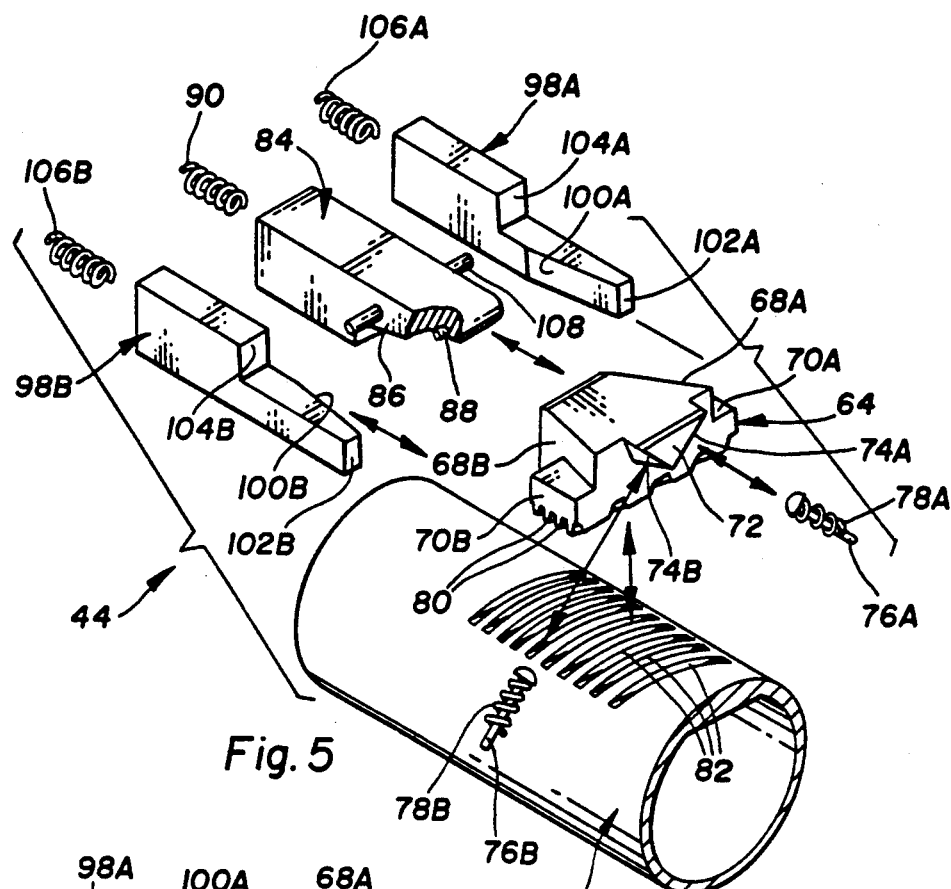
FIG. 5 is a fragmentary exploded perspective view of the manual control according to this invention.
Figure 6A:
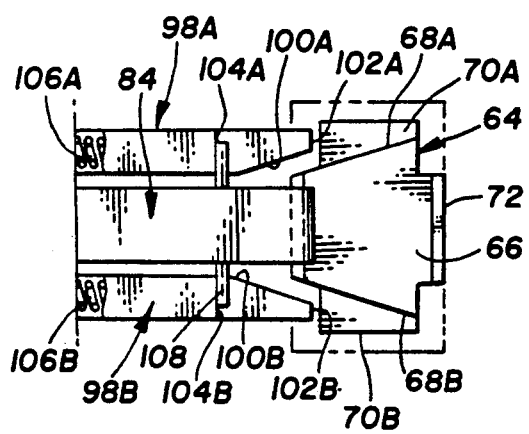
FIGS. 6A-6E are similar to FIG. 3 and illustrate the operation of the manual control according to this invention.
Figure 6B:
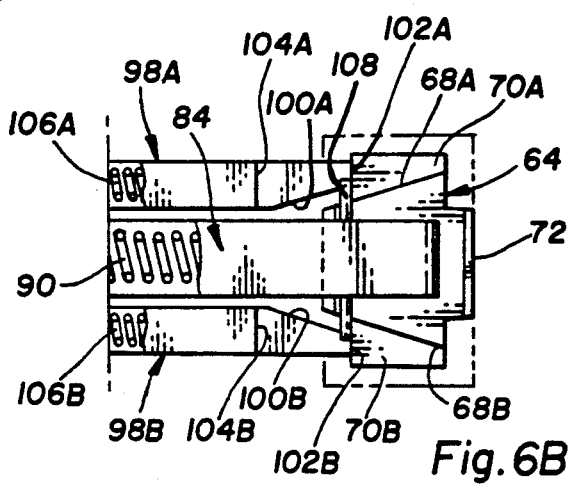
Figure 6C:
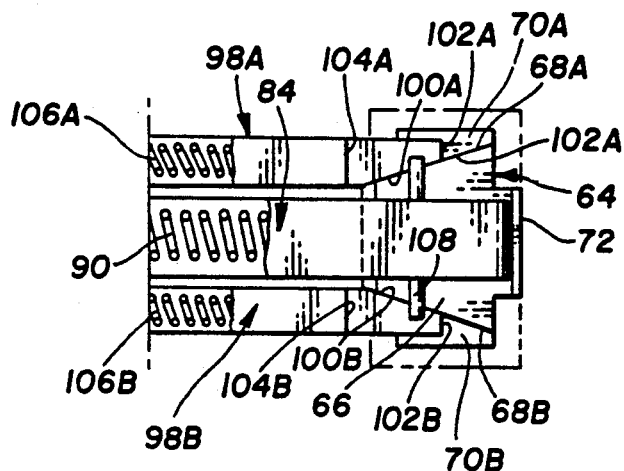
Figure 6D:
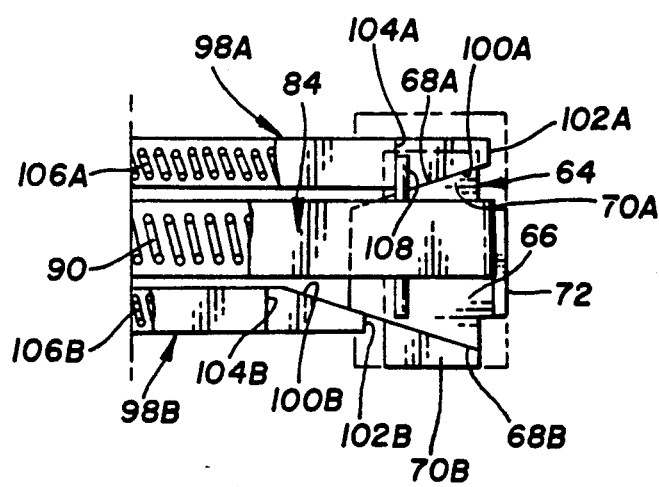
Figure 6E:
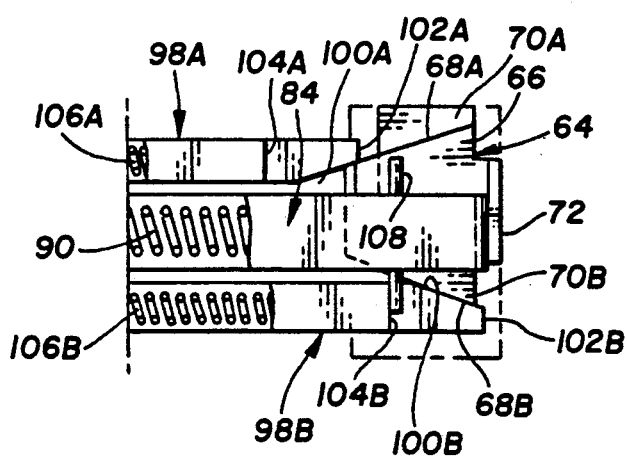

In a lowered position of the clutch element 64 in the housing 46, FIG. 2, a plurality of rack teeth 80 on the bottom of the clutch element mesh with a plurality of correspondingly shaped rack teeth 82, FIGS. 1 and 5, on the inner member 30. In the raised position of the clutch element 64, the rack teeth 80 are withdrawn from the rack teeth 82 so that the inner member is freely shiftable in the direction of centerline 26 relative to outer housing. The rack teeth 80 and 82 are formed at an acute angle relative to the centerline 26 so that lateral movement of the clutch element 64 in the slot 54 effects longitudinal movement of the rack teeth 80 on the clutch element relative to the rack teeth 82 on the inner member 30.

The manual control 44 further includes an actuator 84 supported in the housing 46 between the inner wall 52 and the cover 60 for bodily shiftable movement in the direction of centerline 26. The actuator includes a shoulder 86 generally matching the first inclined ramp 66 on the clutch element 64 and a pin-like bearing 88, FIGS. 2,3 and 5, protruding from the shoulder 86. A spring 90 seated in a counterbore in the actuator 84 urges the latter toward the clutch element 64 and the bearing 88 into engagement on the the first ramp 66. The spring 90, through the mechanical advantage of the first ramp 66, overcomes the springs 78A-B around the plungers 76A-B and resiliently biases the clutch element 64 to its lowered position.

A flexible core 92 of a cable control 94 is connected to the actuator 84. The core extends through the spring 90 and out of the housing 46 through an end fitting 96 of the cable control 94. The distal end of the cable control is located for driver accessibility. When the driver pulls a lever 93 connected to the core 92, the latter pulls the actuator 84 against the spring 90 to withdraw the bearing 88 from the first ramp 66. With the bearing withdrawn, the plungers 76A-B lift the clutch element from its lowered position to its raised position.

The manual control 44 further includes a pair of side bars 98A-B in the housing 46 on opposite sides of the actuator 84. Each side bar is bodily shiftable in the direction of centerline 26 independent of the actuator and of the other side bar. The side bars 98A-B include a pair of angled shoulders 100A-B matching the second and third inclined ramps 68A-B, respectively, on the clutch element 64, a pair of end walls 102A-B, and a pair of flat shoulders 104A-B. A pair of springs 106A-B bias the side bars toward the clutch element. In the lowered position of the clutch element, the angled shoulders 100A-B on the side bars 98A-B slide over the shoulders 70A-B on the clutch element into engagement on the second and third inclined ramps 68A-B. In the raised position of the clutch element 64 the side bars are blocked by engagement of the end walls 102A-B on the shoulders 70A-B regardless of the lateral position of the clutch element. An actuator pin 108 on the actuator 84 engages the side bars 98A-B on the flat shoulders 104A-B when the actuator is pulled back by the core 92. The actuator pin 108 withdraws the side bars 98A-B beyond the shoulders 70A-B on the clutch element.

Referring particularly to FIGS. 6A-6E, the manual control 44 operates as follows. When the driver pulls a lever, not shown, attached to the flexible core 92, the core pulls the actuator 84 toward the second wall 50 of the housing 46. Concurrently, the bearing 88 withdraws from the first inclined ramp on the clutch element and the actuator pin 108 engages the flat shoulders 104A-B on the side bars 98A-B to pull the side bars back from the clutch element, FIG. 6A. As the bearing 88 withdraws from the clutch element, the plungers 76A-B lift the clutch element to its raised position in which the rack teeth 80 are disengaged from the rack teeth 82 on the inner member 30. The driver may then grasp the steering wheel 34 and move it in or out in the direction of centerline 26 until a comfortable position is achieved.

The driver fixes or captures the adjusted position of the steering wheel 34 by releasing the lever attached to the flexible core. The spring 90 moves the actuator 84 toward the clutch element 64 but the shoulders 70A-B on the clutch element block corresponding movement of the side bars 98A-B, FIG. 6B. If, in the selected position of the inner member 30, the rack teeth 80 and 82 mesh exactly, the bearing 88 on the actuator 84 depresses the clutch element 84 directly to its lowered position. Concurrently, the shoulders 70A-B drop below the end walls 100A-B on the side bars 98A-B permitting the springs 106A-B to project the angled shoulders 100A-B against the second and third inclined ramps on the clutch element, FIG. 6C. The actuator 84 holds the clutch element 64 in its lowered position preventing bodily shiftable movement of the inner member and the side bars 98A-B prevent lateral movement of the clutch element in the slot 54.

The clutch element 64 automatically accommodates misalignment between the clutch element rack teeth 80 and rack teeth 82 on the inner member to assure infinite positional adjustment. As the bearing 88 urges the clutch element 64 toward its lowered position, the flanks of the rack teeth 80 come into engagement before the lowered position of the clutch element is achieved. Concurrently, the shoulders 70A-B block the side bars 98A-B as described above. Because of the acute angle of the rack teeth relative to the centerline 26, forces between the engaged flanks resolve into components parallel to the centerline 26 and transverse or lateral relative to the centerline. The lateral force components react against the clutch element 64 and shift it laterally in the slot 54. The lateral movement of the clutch element is accompanied by longitudinal relative movement between the rack teeth until full mesh therebetween is achieved.

As the rack teeth 80-82 achieve full mesh, the clutch element achieves its lowered position. Concurrently, the shoulders 70A-B release the side bars 98A-B as described above. Because of the lateral displacement of the clutch element 64, however, the side bars 98A-B engage the second and third inclined ramps differently. For example, if the clutch element shifts to the left, FIGS. 5 and 6D, then the side bar 98A projects further toward the clutch element 64 than the side bar 98B. Conversely, if the clutch element shifts to the right, FIGS. 5 and 6E, then the side bar 98B projects further toward the clutch element 64 than the side bar 98A. In either circumstance, the lateral position of the clutch element is rigidly maintained by the side bars 98A-B.

The embodiments of the invention in which an exclusive property or privilege is claimed are defined as follows:

1. In a steering column including an outer member and an inner tubular member movable relative to said outer member in the direction of a longitudinal centerline of said steering column so that said steering column is lengthwise adjustable,
    a manual control comprising:
    means defining a plurality of rack teeth on said inner member oriented at a predetermined angle to said longitudinal centerline,
    a housing on said outer member,
    a clutch element mounted on said housing for radial bodily shiftable movement relative to said longitudinal centerline between a lowered position and a raised position and for lateral bodily shiftable movement relative to said longitudinal centerline,
    means defining a plurality of rack teeth on said clutch element oriented at said predetermined angle relative to said longitudinal centerline and meshing with said rack teeth on said inner member in said lowered position of said clutch element to immobilize said inner member relative to said outer member in the direction of said longitudinal axis and disengaged from said inner member rack teeth in said raised position of said clutch element,
    means defining a first inclined ramp on said clutch element,
    means defining a second inclined ramp and a third inclined ramp on said clutch element on opposite sides of said first inclined ramp,
    a first spring means on said housing biasing said clutch element toward said raised position,
    an actuator on said housing movable in the direction of said longitudinal centerline toward and away from said clutch element and engageable on said first inclined ramp when moving toward said clutch element to drive said clutch element from said raised to said lowered position,
    a second spring means biasing said actuator toward said clutch element,
    manual operating means connected to said actuator and operative to move said actuator away from said clutch element against said second spring means,
    a first side bar on said housing movable in the direction of said longitudinal centerline toward and away from said clutch element and engageable on said second inclined ramp when moving toward said clutch element to drive said clutch element laterally in a first direction,
    a third spring means biasing said first side bar toward said clutch element,
    a second side bar on said housing movable in the direction of said longitudinal centerline toward and away from said clutch element and engageable on said third inclined ramp when moving toward said clutch element to drive said clutch element laterally in a second direction opposite said first direction,
    a fourth spring means biasing said second side bar toward said clutch element,
    means operative to move each of said first and said second side bars away from said clutch element as a unit with said actuator, and
    blocking means on said clutch element operative to prevent engagement of each of said first and said second side bars on the corresponding ones of said second and said third inclined ramps until said clutch element achieves substantially said lowered position.

2. The manual control recited in claim 1 wherein said first spring means on said housing engageable on said clutch element includes
    a plunger slidably mounted on said housing and engageable on said clutch element, and
    a coil spring disposed around said plunger with a first end seated on said housing and a second end seated on said plunger.

3. The manual control recited in claim 2 wherein said manual operating means connected to said actuator and operative to move said actuator away from said clutch element includes,
    a flexible core having a first end connected to said actuator and a second end connected to a manually actuated operating member.

4. The manual control recited in claim 3 wherein said means operative to move each of said first and said second side bars away from said clutch element as a unit with said actuator includes
    means on each of said first and said second side bars defining a flat shoulder thereon in a plane perpendicular to said longitudinal centerline, and
    a drive pin rigidly attached to said actuator engageable on said flat shoulder on each of said first and said second side bars during movement of said actuator away from said clutch element.

5. The manual control recited in claim 4 wherein said blocking means on said clutch element operative to prevent engagement of each of said first and said second side bars on the corresponding ones of said second and said third inclined ramps until said clutch element achieves substantially said lowered position includes
    means on said clutch element defining a first shoulder in the path of movement of said first side bar in said raised position of said clutch element and removed from the path of movement of said first side bar in said lowered position of said clutch element, and
    means on said clutch element defining a second shoulder in the path of movement of said second side bar in said raised position of said clutch element and removed from the path of movement of said second side bar in said lowered position of said clutch element.

* * * * *